United States Patent
Ooi et al.

(10) Patent No.: US 7,869,715 B2
(45) Date of Patent: Jan. 11, 2011

(54) DISPERSION COMPENSATING APPARATUS AND DISPERSION COMPENSATION CONTROL METHOD

(75) Inventors: Hiroki Ooi, Kawasaki (JP); Hiroshi Onaka, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 690 days.

(21) Appl. No.: 11/785,896

(22) Filed: Apr. 20, 2007

(65) Prior Publication Data
US 2008/0056710 A1    Mar. 6, 2008

(30) Foreign Application Priority Data
Aug. 31, 2006    (JP)    .............. 2006-235510

(51) Int. Cl.
*H04B 10/12*    (2006.01)
(52) U.S. Cl. ................... 398/147; 398/149; 398/209
(58) Field of Classification Search .......... 398/17, 398/81, 147–149, 158, 159, 192, 209
See application file for complete search history.

(56) References Cited

U.S. PATENT DOCUMENTS

| | | | |
|---|---|---|---|
| 6,411,416 B1 | 6/2002 | Ooi et al. | |
| 6,580,542 B1 | 6/2003 | Song et al. | |
| 6,871,024 B2 | 3/2005 | Nishimoto et al. | |
| 2004/0081393 A1* | 4/2004 | Singh et al. | 385/27 |
| 2004/0141756 A1* | 7/2004 | Nakamura et al. | 398/147 |
| 2004/0161243 A1* | 8/2004 | Ooi et al. | 398/152 |
| 2004/0190911 A1* | 9/2004 | Franco et al. | 398/189 |
| 2004/0213578 A1* | 10/2004 | Takahara et al. | 398/147 |
| 2005/0226613 A1* | 10/2005 | Raddatz | 398/27 |

FOREIGN PATENT DOCUMENTS

| | | |
|---|---|---|
| CN | 1209006 A | 2/1999 |
| EP | 0 812 075 | 12/1997 |
| EP | 1 030 472 | 8/2000 |
| EP | 1 223 694 | 7/2002 |
| EP | 1 443 689 | 8/2004 |
| EP | 1 580 906 | 9/2005 |
| JP | 2002-208892 | 7/2002 |

OTHER PUBLICATIONS

Extended European Search Report, issued in corresponding European Patent Application No. 07008669.9 on Nov. 30, 2007.

(Continued)

*Primary Examiner*—Dzung D Tran
(74) *Attorney, Agent, or Firm*—Staas & Halsey LLP

(57) ABSTRACT

A variable dispersion compensating unit compensates an optical signal, and changes the compensation amount according to a control signal that has a given frequency. After demodulation of the compensated optical signal, error conditions of the signal are monitored and an error signal is output. A band pass filter filters the error signal for a component having a frequency equal to or less than the given frequency. Based on the component and on the control signal, a synchronous detecting circuit generates a compensation amount modification signal. The compensation amount modification signal is superposed on the control signal.

13 Claims, 12 Drawing Sheets

OTHER PUBLICATIONS

Office Action issued May 23, 2008 in corresponding European Patent Application No. 07008669.9.

Grant Nicholson et al., "Polarization Fluctuation Measurements on Installed Single-Mode Optical Filber Cables" Journal of Lightwave Technology vol. 7 No. 8 p. 1197-1200, Aug. 1989.

D.L. Peterson Jr. et al., "Field measurements of state of polarization and PMD from a tier-1 carrier" FI1, Feb. 2004.

P.M. Krummrich and K. Kotten, "Extremely fast (microsecond timescale) polarization changes in high speed long haul WDM transmission systems" F13, 2004.

Hiroki Ooi et al., "40-Gbit/s WDM Automatic Dispersion Compensation with Virtually Imaged Phased Array (VIPA) Variable Dispersion Compensators" IEICE Transactions on Communications vol. E85-B No. 2 p. 463-469, Feb. 2002.

Sadayuki Matsumoto et al., "Tunable Dispersion Equalizer with a Divided Thin-Film Heater for 40-Gb/s RZ Transmissions" IEEE Photonics Technology Letters, vol. 13 No. 8 p. 827-829, Aug. 2001.

Chinese Office Action issued Aug. 27, 2010 in corresponding Chinese patent application No. 200710107461.9.

* cited by examiner

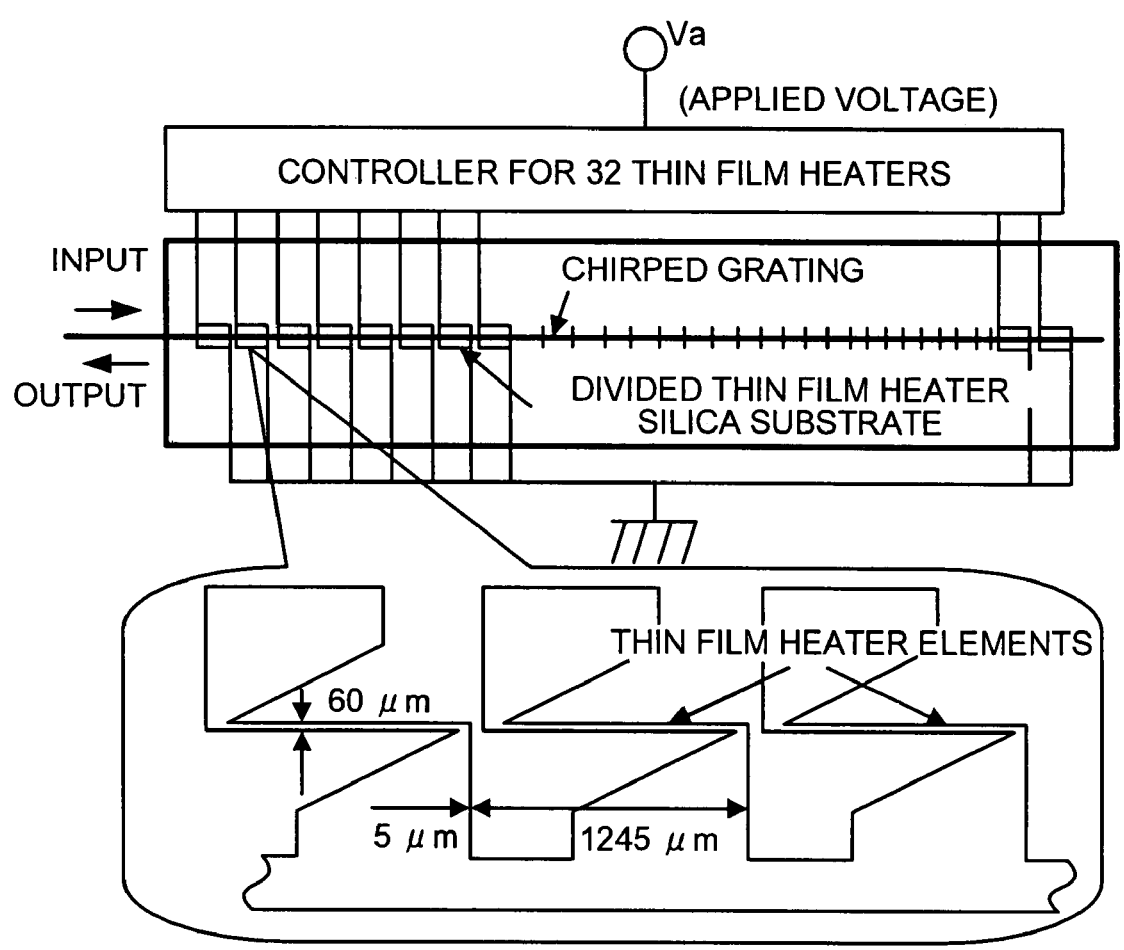

DISPERSION COMPENSATING APPARATUS AND DISPERSION COMPENSATION CONTROL METHOD

CROSS-REFERENCE TO RELATED APPLICATIONS

This application is based upon and claims the benefit of priority from the prior Japanese Patent Application No. 2006-235510, filed on Aug. 31, 2006, the entire contents of which are incorporated herein by reference.

BACKGROUND OF THE INVENTION

1. Field of the Invention

The present invention relates to a dispersion compensating apparatus and a dispersion compensation control method for an optical transmission system.

In recent years, research and development of 40 Gbit/s optical transmission systems has actively advanced. One of the problems with realization of 40 Gbit/s optical transmission systems is that the chromatic dispersion tolerance of 40 Gbit/s optical signals is as small as $1/16$ of that of 10 Gbit/s optical signals. The chromatic dispersion tolerance of 40 Gbit/s optical signals is, for example, approximately 70 ps/nm for nonreturn-to-zero (NRZ) modulated optical signals, and approximately 200 ps/nm for return to zero-differential quadrature phase shift keying (RZ-DQPSK) modulated optical signals.

Therefore, the effect of a change in the degree of chromatic dispersion caused by temperature changes of the transmission line and the dispersion compensating fiber (DCF) during the optical transmission system operation is too large to be ignored. To cope with fluctuations in the degree of chromatic dispersion during operation of the optical transmission system, automatic dispersion compensation using a variable dispersion compensating unit is required.

To realize automatic dispersion compensation by a variable dispersion compensating unit, a method of monitoring the bit error rate (BER) and controlling the compensation amount of the variable dispersion compensating unit to minimize the BER has been proposed such as the method described in Japanese Patent Application Laid-Open Publication No. 2002-208892. To monitor the BER, a method of monitoring the error correction rate in the forward error correction (FEC) can be used.

2. Description of the Related Art

In the method described above, not only the BER due to the effect of the chromatic dispersion but also the BERs due to factors other than chromatic dispersion are monitored without distinction. Therefore, even if the compensation amount by the variable dispersion compensating unit is controlled such that the BER is minimized, the amount of compensation by the variable dispersion compensating unit may not necessarily be the optimal compensation amount corresponding to the chromatic dispersion of the transmission fiber.

In particular, polarization fluctuations, an error factor other than the chromatic dispersion, drastically changes with a change in the state of the transmission line, such as a fiber contact. Therefore, if the compensation amount by the variable dispersion compensating unit is controlled by the method mentioned above without taking into account the BER due to factors resulting from polarization fluctuations, the compensation amount by the variable dispersion compensating unit is not necessarily the optimal amount.

Factors resulting from polarization fluctuations include, for example, polarization mode dispersion (PMD), polarization dependent loss (PDL), and polarization dependent gain (PDG) caused by the transmission line and components such as an optical amplifier.

The present invention solves the problem and aims to provide a dispersion compensating apparatus and a dispersion compensation control method for optimally controlling the amount of compensation by the variable dispersion compensating unit, even when the bit errors due to factors other than chromatic dispersion occur.

SUMMARY OF THE INVENTION

It is an object of the present invention to at least solve the above problems in the conventional technologies.

An apparatus according to one aspect of the present invention that performs dispersion compensation on an optical signal according to a control signal of a predetermined frequency includes a demodulating unit that demodulates the optical signal subjected to the dispersion compensation; a monitoring unit that monitors error conditions of the optical signal demodulated by the demodulating unit, and outputs an error signal indicating the error conditions; a filtering unit that filters the error signal and allows a component to pass through, wherein the component has a frequency substantially equal to or less than the predetermined frequency; a generating unit that generates a modification signal based on the control signal and the component of the error signal; and a superposing unit that superposes the modification signal on the control signal to change an amount of the dispersion compensation.

A method according to another aspect of the present invention for performing dispersion compensation on an optical signal according to a control signal of a predetermined frequency includes demodulating the optical signal subjected to the dispersion compensation; monitoring error conditions of the optical signal demodulated at the demodulating; outputting an error signal indicating the error conditions monitored at the monitoring; filtering the error signal for allowing a component to pass through, wherein the component has a frequency substantially equal to or less than the predetermined frequency; generating a modification signal based on the control signal and the component of the error signal; and superposing the modification signal on the control signal to change an amount of the dispersion compensation.

An apparatus according to yet another aspect of the present invention that performs dispersion compensation on an optical signal according to a control signal of a predetermined frequency includes a monitoring unit that monitors error conditions of a demodulated signal obtained by demodulating the optical signal, and outputs an error signal indicating the error conditions; a generating unit that generates a modification signal based on the control signal and the error signal; and a superposing unit that superposes the modification signal on the control signal to change an amount of the dispersion compensation.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1C is a diagram of a fiber Bragg grating (FBG) variable dispersion compensating unit;

DETAILED DESCRIPTION OF THE PREFERRED EMBODIMENTS

Referring to the accompanying drawings, exemplary embodiments according to the present invention are explained in detail below.

Figure 1A:
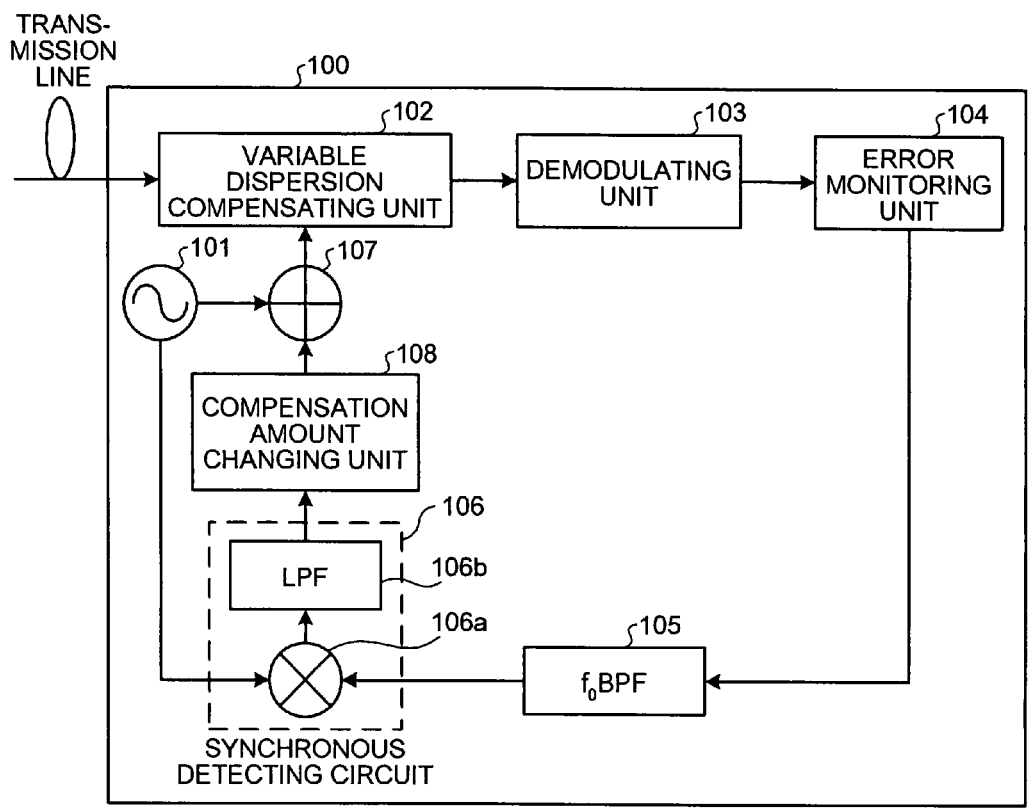
FIG. 1A is a block diagram of a dispersion compensating apparatus according to a first embodiment of the present invention.

FIG. 1A is a block diagram of a dispersion compensating apparatus according to a first embodiment of the present invention. As shown in FIG. 1A, a dispersion compensating apparatus 100 according to the first embodiment includes a low frequency oscillating circuit 101, a variable dispersion compensating unit 102, a demodulating unit 103, an error monitoring unit 104, a band pass filtering unit (BPF) 105, a synchronous detecting circuit 106, and a superposing circuit 107.

The low frequency oscillating circuit 101 generates a low frequency signal. The low frequency oscillating circuit 101 sends the low frequency signal to the variable dispersion compensating unit 102 via the superposing circuit 107. Moreover, the low frequency oscillating circuit 101 sends the low frequency signal to the synchronous detecting circuit 106. The frequency of the low frequency signal is determined based on changes in the amount of compensation by the variable dispersion compensating unit 102. Specifically, the low frequency signal has a frequency that is low enough for changes in the compensation amount by the variable dispersion compensating unit 102 to follow, and yet high enough to out pace changes in the chromatic dispersion produced in a transmission line (hereinafter, a "frequency $f_0$"). For example, the low frequency signal is a signal of approximately 1 hertz. In addition, if endurance of factors effecting change of the variable dispersion compensating unit 102 is high, the low frequency signal can be set to a high frequency.

The variable dispersion compensating unit 102 receives an optical signal transmitted from a transmission apparatus (not shown) through a transmission line, and compensates the optical signal at a variable compensation amount. The variable dispersion compensating unit 102 sends the compensated optical signal to the demodulating unit 103. The variable dispersion compensating unit 102 changes the compensation amount according to the compensation amount modification signal (described below) sent from the superposing circuit 107. Here, illustrative examples of the variable dispersion compensating unit 102 are described.

Figure 1B:
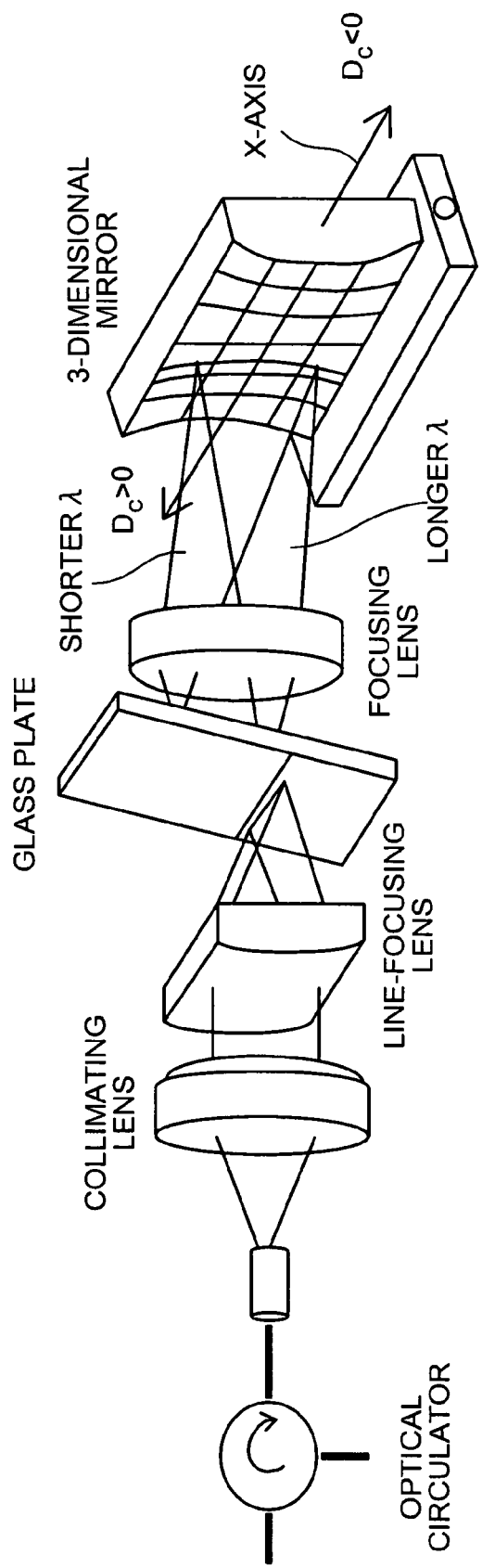
FIG. 1B is a diagram of a virtually imaged phased array (VIPA) variable dispersion compensating unit.

FIG. 1B is a diagram of a VIPA-type variable dispersion compensating unit (refer, Hiroki Ooi et al., "40-Gbit/s WDM automatic dispersion compensation with VIPA variable dispersion compensators", IEICE Trans. Commun., Vol. E85-B, No. 2, Feb. 2002).

The compensation amount is changed by rotating a stepping motor to move a 3D mirror in an X-axis direction, the mirror being arranged on a stage. The shape of the 3D mirror is designed such that the desired compensation amount may be passed at each X-axis position. When the compensation amount is changed according to the low frequency signal, the direction of movement and the number of driving pulses of the stepping motor are changed.

FIG. 1C is a diagram of an FBG variable dispersion compensating unit (refer, S. Matsumoto et al., "Tunable dispersion equalizer with a divided thin-film heater for 40-Gb/s RZ transmissions", IEEE Photonics Technology Letters, Vol. 13, No. 8, August 2001).

A thin-film heater is arranged on an FBG, and the compensation amount is changed by temperature. When the compensation amount is changed according to the low frequency signal, the temperature of the thin-film heater minutely changes. In addition to these units, various variable dispersion compensating units, such as a stress change FBG-type, an etalon-type, an arrayed waveguide grating-type (AWG), and the like have been disclosed, and the techniques of the present invention are applicable to any variable dispersion compensating unit.

The demodulating unit 103 demodulates the optical signal sent from the variable dispersion compensating unit 102, and sends the demodulated signal to the error monitoring unit 104. A method by which the demodulating unit 103 demodulates the signal corresponds to the various demodulating methods in the optical transmission systems to which the dispersion compensating apparatus 100 is applied.

The error monitoring unit 104 monitors the error condition of the demodulated signal sent from the demodulating unit 103. The error monitoring unit 104 sends signals indicating error conditions of the demodulated signal to the band pass filtering unit 105. Information indicating the error condition of the demodulated signal is, for example, information on the BER.

Specifically, the information on the BER is the information on the BER per unit bit number, and the BER per unit time. The error monitoring unit 104 has, for example, an FEC decoder function that performs error correction processing based on the error correction code given to the demodulated signal, and monitors the BER by performing error correction processing.

The band pass filtering unit 105 passes the signals having a frequency $f_0$ from signals indicating error conditions. The band pass filtering unit 105 sends the passed signal to the synchronous detecting circuit 106. The band pass filtering unit 105 can be equipped with, for example, a band pass filter that passes only signals having a frequency near $f_0$ and attenuates other frequency signals.

When a change in the BER due to a high-speed (faster than $f_0$) polarization change caused by, for example, fiber contact or the like occurs, the error rate change components due to this polarization change can be excluded from the signals indicating error conditions by the band pass filtering unit 105. The band pass filtering unit 105 may be a low pass filter that passes signals having a frequency less than or equal to $f_0$.

The synchronous detecting circuit 106 generates compensation amount modification signals, based on the low frequency signal having the frequency $f_0$ sent from the low frequency oscillating circuit 101 and the signal having the frequency $f_0$ sent from the band pass filtering unit 105. The synchronous detecting circuit 106 sends the compensation amount modification signals to the superposing circuit 107. For example, the synchronous detecting circuit 106 generates the compensation amount modification signal by comparing the phases of these signals. The synchronous detecting circuit 106 includes, for example, of a multiplying circuit 106a and a low pass filter 106b.

The multiplying circuit 106a multiplies the low frequency signal having the frequency $f_0$ sent from the low frequency oscillating circuit 101 and the signal having the frequency $f_0$ sent from the band pass filtering unit 105 together, and sends the multiplied signal to the low pass filter 106b. The low pass filter 106b passes signals having frequencies lower than $f_0$ from the multiplied signal. The low pass filter 106b sends the passed signals to the superposing circuit 107, as a compensation amount modification signal.

The superposing circuit 107 superposes the compensation amount modification signal sent from the synchronous detecting circuit 106 onto the low frequency signal having the frequency $f_0$ sent from the low frequency oscillating circuit 101 to the variable dispersion compensating unit. In this way, the dispersion compensating apparatus 100 can feedback results of the compensation carried out by the variable dispersion compensating unit 102 to the variable dispersion compensating unit 102 and can control the result of the compensation, by monitoring the error condition.

The dispersion compensating apparatus 100 has a compensation amount changing unit 108 between the synchronous detecting circuit 106 and the superposing circuit 107. The compensation amount changing unit 108 provides a negative feedback gain to the signal (the compensation amount modification signal) received from the synchronous detecting circuit 106, and sends the resulting signal to the superposing circuit 107, and thereby has a function to change the compensation amount at this time. Specifically, the compensation amount changing unit 108 provides a negative feedback gain by subtracting the product of negative feedback gain β and input signal $V_{in}$ from the compensation amount D at the time.

Each constituent element mentioned above can be constituted with any program that performs digital processing, as well as with a device that performs analog processing. For example, a program having the function described above may realize each of the circuits, instead of an actual analog circuit. Each filter can be realized not by an analog filter but by a digital filter having the function described above.

Figure 2:
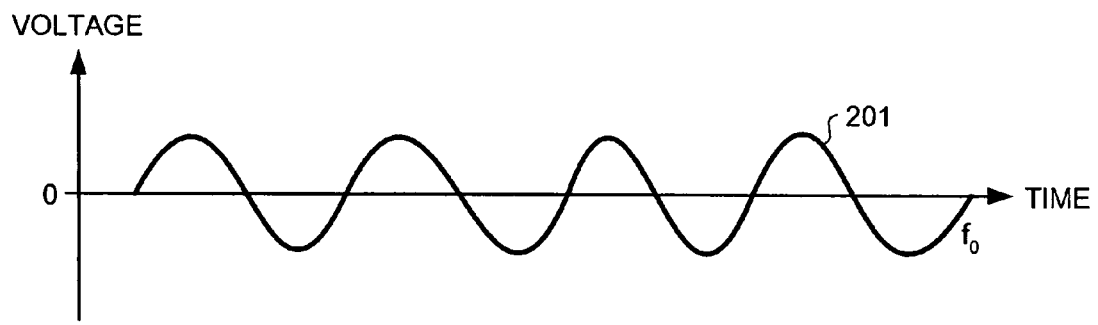
FIG. 2 is a waveform diagram of a low frequency signal.

FIG. 2 is a waveform graph of a low frequency signal generated by the low frequency oscillating circuit. In FIG. 2, the abscissa is time and the ordinate, voltage of the low frequency signal. As mentioned above, the low frequency oscillating circuit 101 generates a low frequency signal 201 having the frequency $f_0$.

Figure 3:
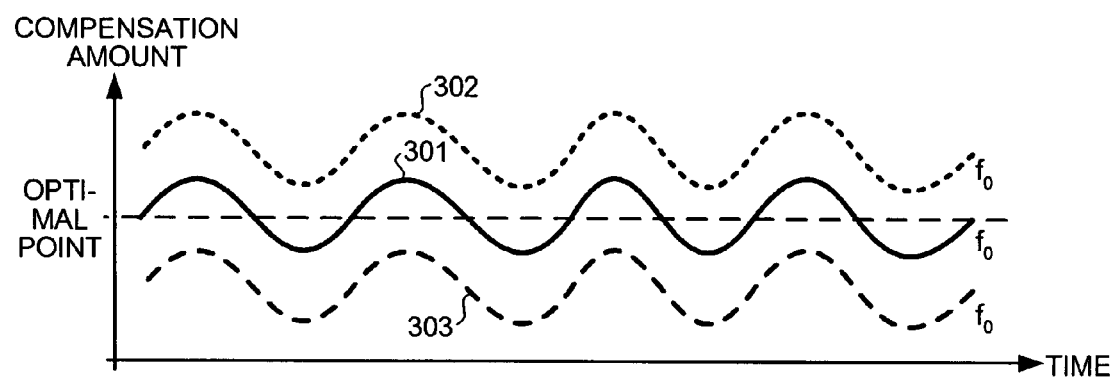
FIG. 3 is a graph of temporal changes in the amount of compensation by a variable dispersion compensating unit.

FIG. 3 is a diagram of the temporal change in the compensation amount by the variable dispersion compensating unit. In FIG. 3, the abscissa is time and the ordinate, the compensation amount of the variable dispersion compensating unit 102. The compensation amount by the variable dispersion compensating unit 102 changes in proportion to the voltage of the low frequency signal CPU 201. Hence, the compensation amount changes with the frequency $f_0$, as shown in FIG. 3.

The low frequency signal 201 is superimposed on the compensation amount modification signal output from the synchronous detecting circuit 106, and as a result, the compensation amount changes with the frequency $f_0$ (in the figure, compensation amounts 301 to 303). Here, the compensation amount 301 is assumed to be the optimal compensation amount, i.e., the amount equivalent to the degree of chromatic dispersion generated in the transmission line (in the case that the remaining dispersion is 0). The compensation amount 302 indicates a larger compensation amount compared to the degree of chromatic dispersion generated in the transmission line. The compensation amount 303 indicates a smaller compensation amount compared to the degree of chromatic dispersion generated in the transmission line.

Figure 4:
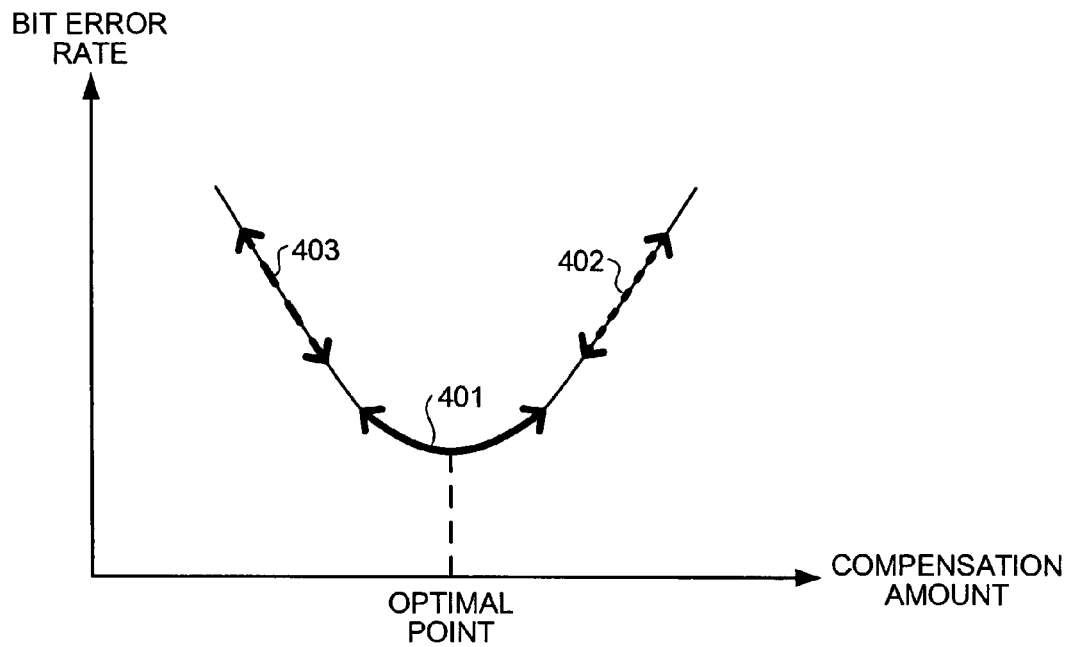
FIG. 4 is a graph of the compensation amount by a variable dispersion compensating unit versus the BER.

FIG. 4 is a graph explaining the relationship between the compensation amount of the variable dispersion compensating unit and the BER. Generally, the optimal compensation amount of the variable dispersion compensating unit 102 is sought by changing the compensation amount while monitoring the error condition. The optimal compensation amount is, for example, the amount when the BER is minimized (the optimal point in the figure). The compensation amount 301 in FIG. 3 varies in a range 401 of the graph, the compensation amount 302 in a range 402, and the compensation amount 303 in a range 403 respectively, all having the frequency $f_0$.

Figure 5:
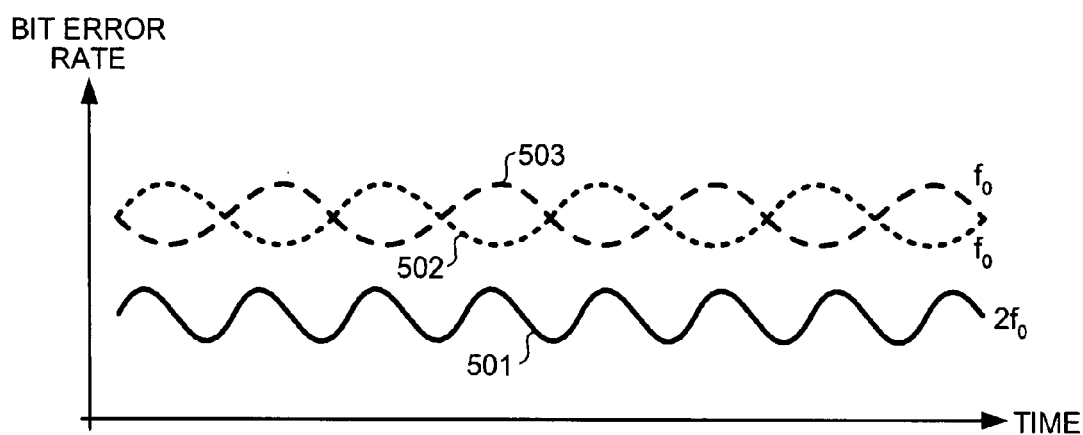
FIG. 5 is a diagram of signal waveforms indicating monitored BERs.

FIG. 5 is a waveform diagram of signal waveforms of the BERs monitored by the error monitoring unit. In FIG. 5, BERs 501, 502, and 503 are the BERs for the compensation amounts 301, 302, and 303 respectively. The BER 501 changes in the range 401 (see FIG. 4). Accordingly, the BER 501 is smaller than BER 502 and 503 overall. While the compensation amount 301 changes with the frequency $f_0$ for one cycle, the BER 501 passes the optimal point at which the BER is the minimum twice. Accordingly, BER 501 changes with frequency $2f_0$, twice as large as $f_0$.

Because BERs 502 and 503 change in the ranges 402 and 403 respectively, their changes are always in the opposite directions. Thus, the phases of the BER waveforms 502 and 503 are always mutually reversed (the phases differ 180° relative to each other). While the compensation amounts 302 and 303 change with the frequency $f_0$ for one cycle, the BERs 502 and 503 pass the point at which each BER becomes minimum once. Accordingly, the BERs 502 and 503 change with the frequency $f_0$.

Figure 6:
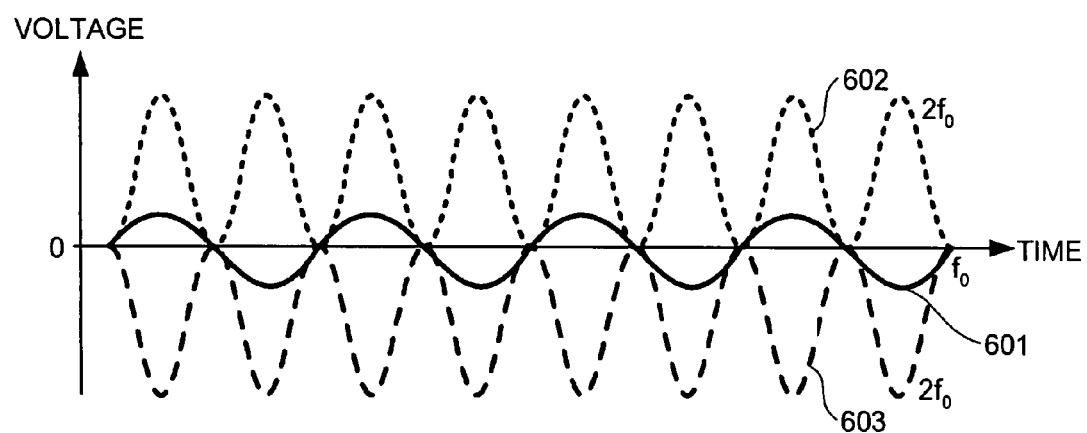
FIG. 6 is a diagram of the waveforms of multiplied signals.

FIG. 6 is a waveform diagram of the multiplied signal waveforms calculated by the multiplying circuit. As mentioned above, the multiplying circuit 106a multiplies the low frequency signal 201 (see FIG. 2) and the signal output from the band pass filtering unit 105 together. The signal output from the band pass filtering unit 105 is the signal having the frequency $f_0$ passed by the band pass filtering unit 105 from the BER signals shown in FIG. 5 (501, 502, and 503), i.e., the BER signal 502 or 503.

For the signal having the BER 501, the signal passed by the band pass filtering unit 105 is null. Thus, the multiplied signal passed by multiplication of the null signal and the low frequency signal having the frequency $f_0$ output from the low frequency oscillating circuit 101 becomes a multiplied signal 601. That is, the low frequency signal 201 becomes the multiplied signal 601 having the frequency $f_0$ without change.

For the signal having the BER 502, the signal passed by multiplication of the signal passed by the BER 502 passed by the band pass filtering unit 105 and the low frequency signal 201 is a multiplied signal 602. Because the frequencies of the signal with the BER 502 and of the low frequency signal 201 are both $f_0$, the frequency of the multiplied signal 602 is $2f_0$.

For the signal having the BER 503, the signal passed by multiplication of the signal having the BER 503 passed by the band pass filtering unit 105 and the low frequency signal 201 is a multiplied signal 603. In this case as well, the frequency of the multiplied signal 603 is $2f_0$. Here, the signal having the BER 502 and the low frequency signal 201 are in-phase. On the other hand, the signal having the BER 503 and the low frequency signal 201 are in-antiphase. Accordingly, the waveform of the multiplied signal 603 becomes the shape of the multiplied signal 602 multiplied by −1.

Figure 7A:
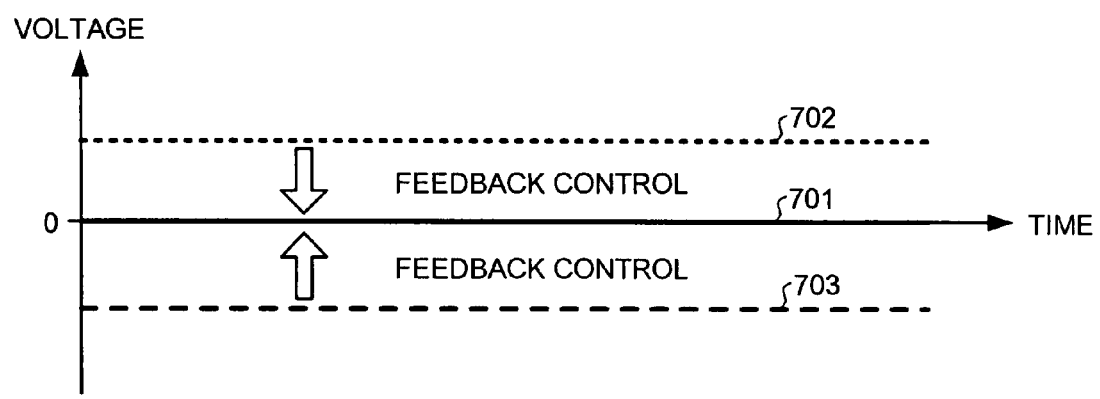
FIG. 7A is a diagram of compensation amount modification signals passed by the low pass filter.
Figure 7B:
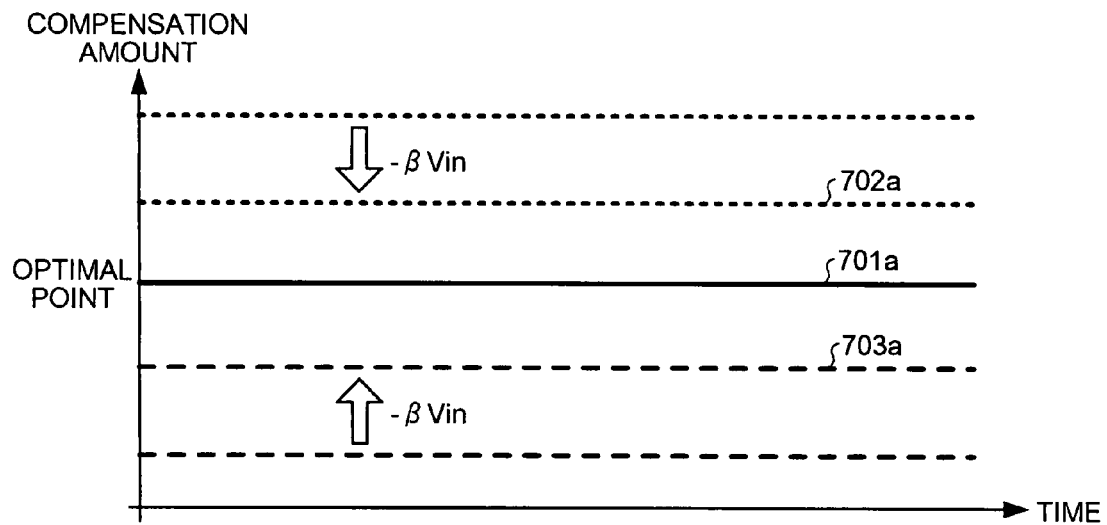
FIG. 7B is a diagram of the feedback gain provided signals.

FIG. 7A is a waveform diagram of the compensation amount modification signal passed by the low pass filter. FIG. 7B is a waveform diagram of a signal to which negative feedback gain has been applied by the compensation amount changing unit. As mentioned above, the low pass filter 106b, as the compensation amount modification signal, passes the low frequency signal from the multiplied signals. 601, 602 or 603 generated by the multiplying circuit 106a.

For the multiplied signal 601 (i.e., for the compensation amount 301), the voltage of the compensation amount modification signal passed by the low pass filter 106b is 0, like a compensation amount signal 701. In this case, the compensation amount modification signal is not changed by the compensation amount changing unit 108, and becomes a compensation amount 701a, and so the compensation amount is maintained at the previous value.

For the multiplied signal 602 (i.e., for the compensation amount 302), the voltage of the compensation amount modification signal passed by the low pass filter 106b becomes a positive value like a signal 702. In this case, the compensation amount modification signal is given a negative feedback gain by the compensation amount changing unit 108, and becomes a compensation amount 702a, so that the compensation amount changes to the negative direction relative to the previous value.

For the multiplied signal 603 (i.e., for the compensation amount 303), the voltage of the compensation amount modification signal passed by the low pass filter 106b becomes of a negative value like a signal 703. In this case, the compensation amount modification signal is given a negative feedback gain by the compensation amount changing unit 108, and becomes the compensation amount 703a, so that the compensation amount changes to the positive direction relative to the previous value.

The dispersion compensating apparatus 100 can, thus, feedback the result of the compensation to the variable dispersion compensating unit 102 and control the result of the compensation by monitoring error conditions. The dispersion compensating apparatus 100 repeats this feedback control, and can control the compensation amount of the variable dispersion compensating unit 102 to be the optimal amount.

In this way, in the dispersion compensating apparatus 100 according the first embodiment, the compensation amount of the variable dispersion compensating unit 102 can be automatically controlled, and in addition, the BER caused by factors other than chromatic dispersions, such as the high-speed polarization changes, can be excluded from the BERs used for controlling the compensation amount. Accordingly, by way of the dispersion compensating apparatus 100 according to the first embodiment, even if bit errors due to factors other than chromatic dispersion arise, the compensation amount of the variable dispersion compensating unit 102 can be controlled to be the optimal amount.

In addition, when a bit error change is caused by a polarization fluctuation sufficiently slower than the time interval of the feedback loop, the compensation amount of the variable dispersion compensating unit 102 is automatically controlled to be the optimal value (the point of the minimum error).

Figure 8:
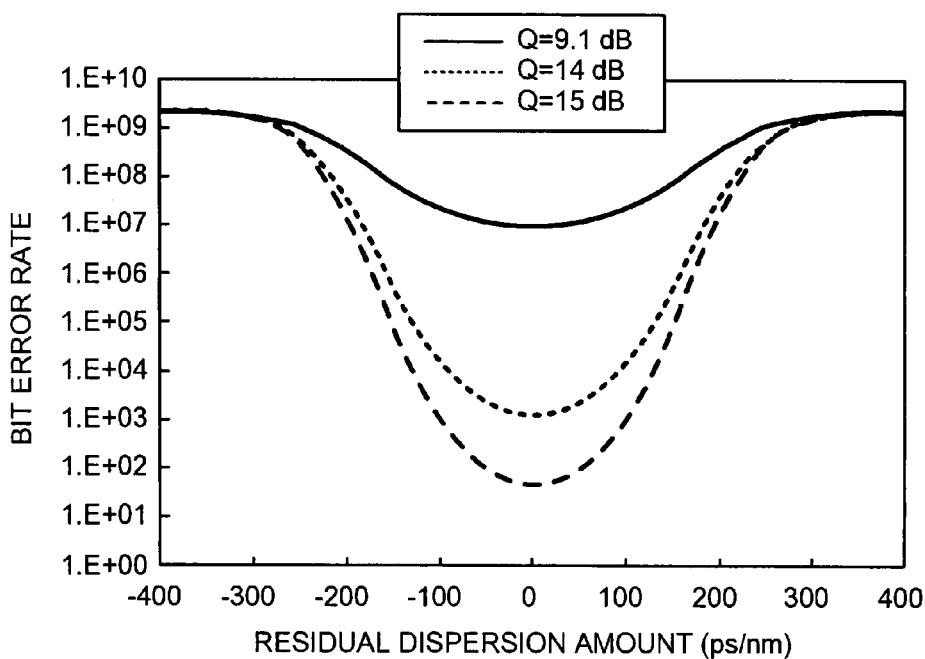
FIG. 8 is a graph of the BER versus the residual dispersion amount for each Q-value at the optimal dispersion point.
Figure 9:
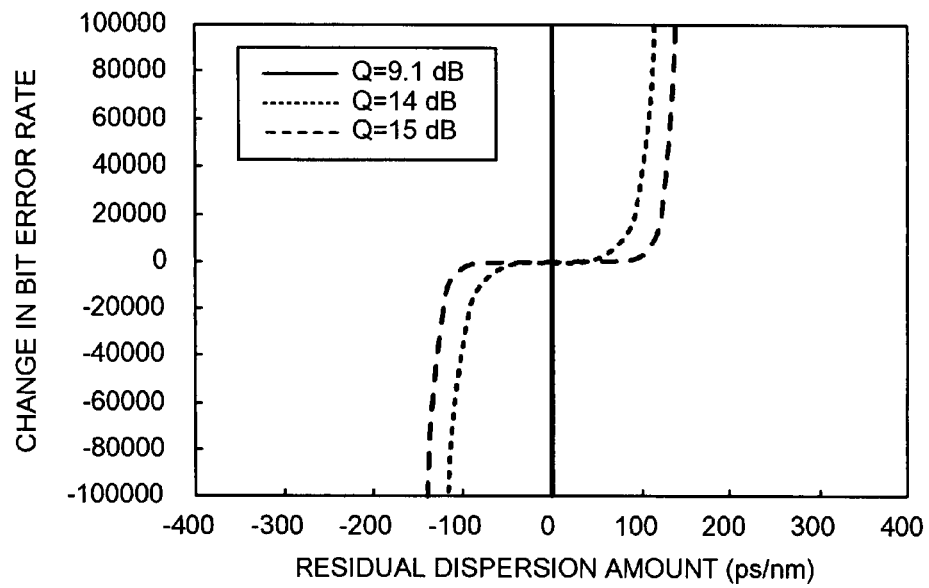
FIG. 9 is a graph of the changes in the BER versus the residual dispersion amount for each Q-value at the optimal dispersion point.

FIG. 8 is a graph explaining the relationship between the BER and an amount of residual dispersion for each Q-value at a dispersion optimal point. FIG. 9 is a graph explaining the relationship between changes in the BER and the residual dispersion amount for each Q-value at the dispersion optimal point. That is, curves in FIG. 9 are passed by differentiating the BERs in FIG. 8 by the residual dispersion amount, and are values proportional to the outputs by the synchronous detecting circuit 106. The residual dispersion amount is the chromatic dispersion amount that remains after the dispersion is compensated by the variable dispersion compensating unit 102. The Q-value at the dispersion optimal point changes mainly depending on the optical signal noise ratio (OSNR) of the transmission signal.

As shown in FIGS. 8 and 9, when the Q-value at the dispersion optimal point differs (i.e., the OSNR of the transmission signal differs), the shape of the curve of error rate versus the residual dispersion amount changes drastically. Accordingly, when the OSNR of the transmission line differs, the detection sensitivity for the synchronous detection differs greatly. In this condition, the settings of the amplifier (not shown) and the like in the dispersion compensating apparatus must be changed whenever OSNR changes.

Figure 10:
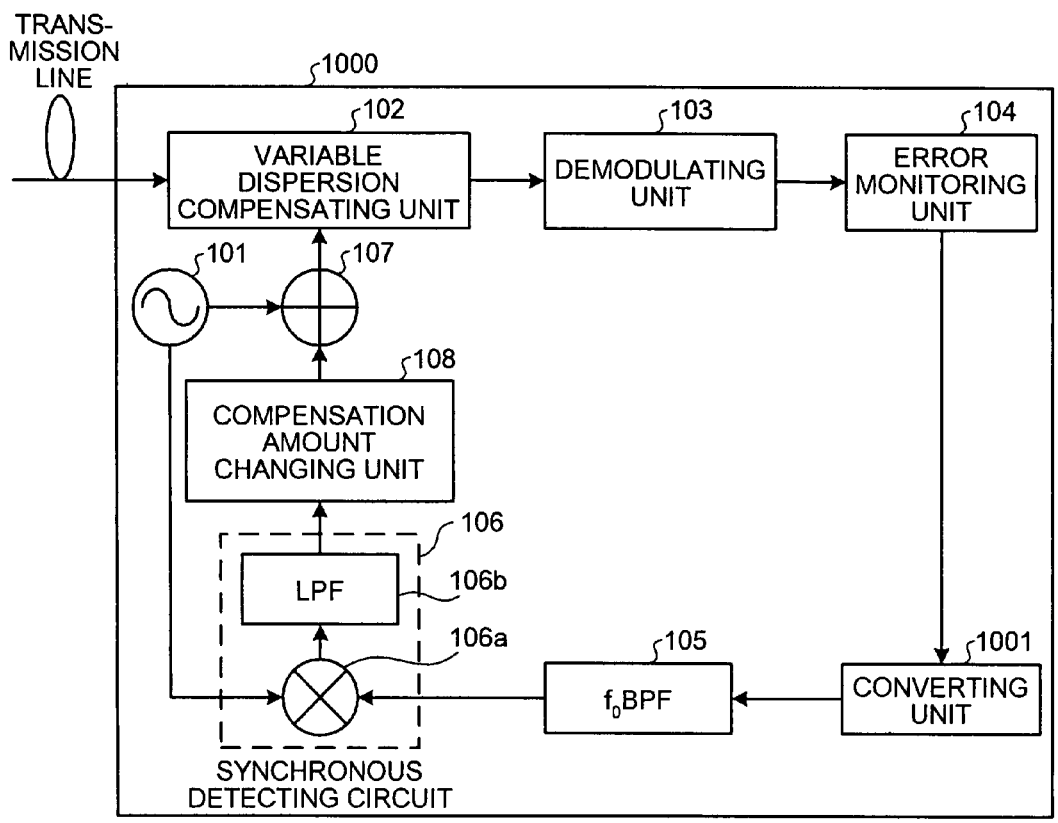
FIG. 10 is a block diagram of a dispersion compensating apparatus according to a second embodiment of the present invention.

FIG. 10 is a block diagram of a dispersion compensating apparatus according to a second embodiment of the present invention. Among the elements of the dispersion compensating apparatus according to the second embodiment, elements that are the same constituents as those of the dispersion compensating apparatus 100 according to the first embodiment are indicated by the same reference characters and their explanation is omitted. As shown in FIG. 10, the dispersion compensating apparatus 1000 according to the second embodiment has a converting unit 1001 between the error monitoring unit 104 and the band pass filtering unit 105.

The converting unit 1001 performs a predetermined logarithmic conversion or a Q-value conversion on signals indicating error conditions output from the error monitoring unit 104. The converting unit 1001 outputs the converted signals to the band pass filtering unit 105 after the predetermined logarithmic conversion or the Q-value conversion. The band pass filtering unit 105 passes the signals having the frequency $f_0$ from the converted signals, and outputs the signals passed to the synchronous detecting circuit 106.

When the converting unit 1001 performs a predetermined logarithmic conversion, the converting unit 1001 calculates a predetermined logarithmically converted value using the following equation (1), based on the signals indicating error conditions (BER) output from the error monitoring unit 104. Here, BER can be calculated by Err/B, where Err is the BER (for example, the number of bit errors within 100 ms), and B is the total bits (for example, the total bits in 100 ms, B=4.3× 109). A constant A is a gain coefficient (for example, A=6700), $$\text{Logarithmically converted value} = -A \times \text{Log}(-\text{Log}(\text{BER})) \tag{1}$$

Figure 11:
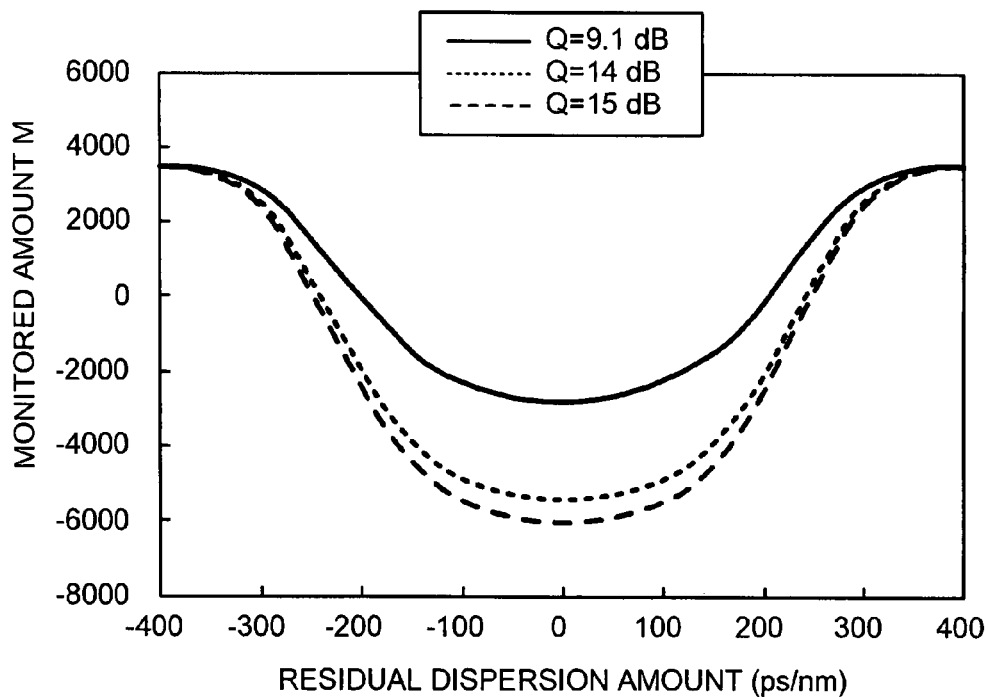
FIG. 11 is a graph of the monitored amounts of logarithmically converted signals versus the residual dispersion amount.
Figure 12:
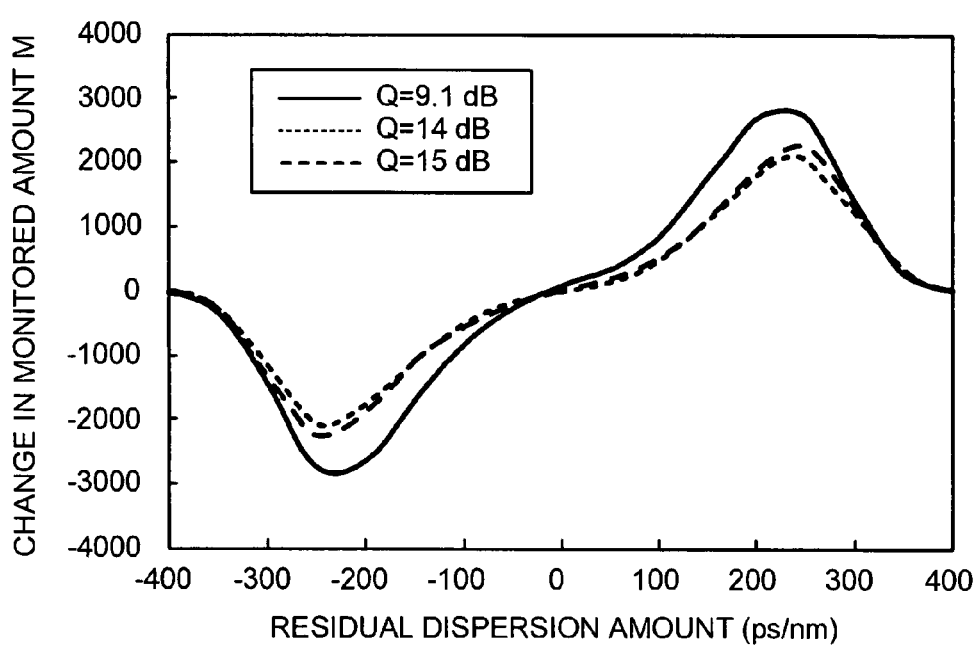
FIG. 12 is a graph of the monitored amount changes of the logarithmically converted signal versus the residual dispersion amount.

FIG. 11 is a graph explaining the relationship between the monitored amount of the signal logarithmically converted by the converting unit and the residual dispersion amount. FIG. 12 is a graph explaining the relationship between the change of the monitored amount of the signal logarithmically converted by the converting unit 1001 and the residual dispersion amount. As shown in FIGS. 11 and 12, even when the Q-values at the dispersion optimal point differ, the shapes of the curves of the monitored amount M of the converted signals logarithmically converted in a predetermined manner by the converting unit 1001 versus the residual dispersion amount become nearly the same. That is, even when the OSNR of the transmission line differs, a constant detection sensitivity of the synchronous detection can be passed.

When the converting unit 1001 performs Q-value conversion, the converting unit 1001 converts a BER into a Q-value based on the signals indicating error conditions output from the error monitoring unit 104. To convert the BER into the Q-value, a BER/Q-value converting table or a BER/Q-value converting equation, etc. is used.

Figure 13:
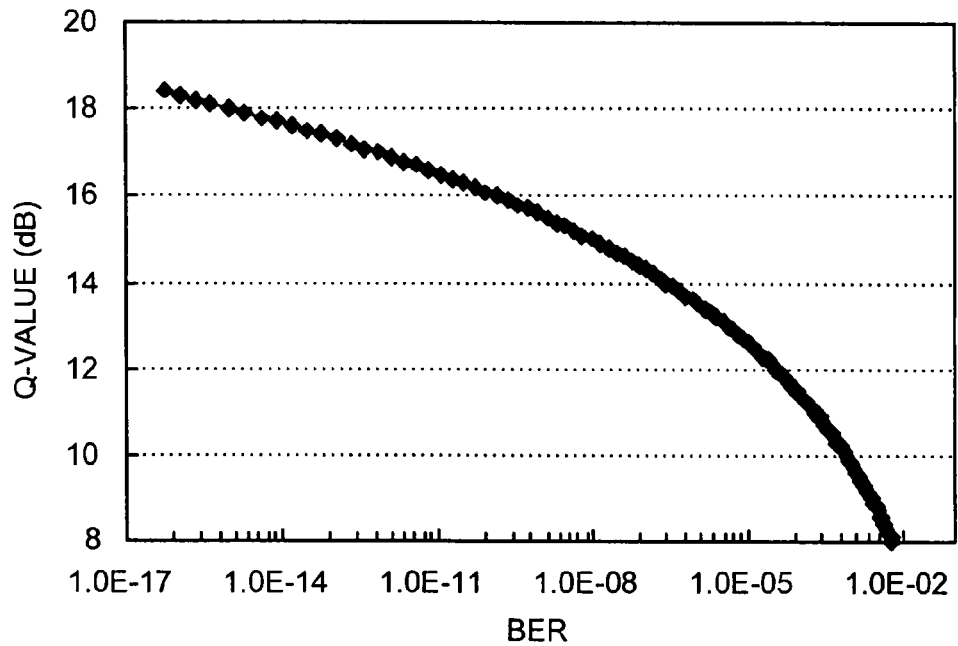
FIG. 13 is a graph of the BER versus the Q-value.

FIG. 13 is a graph explaining the relationship between the BER and the Q-value. As shown in FIG. 13, the BER and the Q-value correspond to each other one to one. Thus, the converting unit 1001 can convert the BER into the Q-value by equipment of a BER/Q-value table. The converting unit 1001 can also calculate the Q-value from the BER using the following BER/Q-value equation, an equation (2). In the equations, sqrt( ) is a function to calculate square root, erfc( ) is a complementary error function given by the following equation (3), and erf( ) in the equation (3) is an error function given by the following equation (4).

$$BER = \frac{1}{2} \times \text{erfc}\left(\frac{Q}{sqrt(2)}\right) \quad (2)$$

$$\text{erfc}(x) = \frac{2}{\sqrt{\pi}} \int_x^\infty e^{-t^2} dt = 1 - \text{erf}(x) \quad (3)$$

$$\text{erf}(x) = \frac{2}{\sqrt{\pi}} \int_0^x e^{-t^2} dt \quad (4)$$

Figure 14:
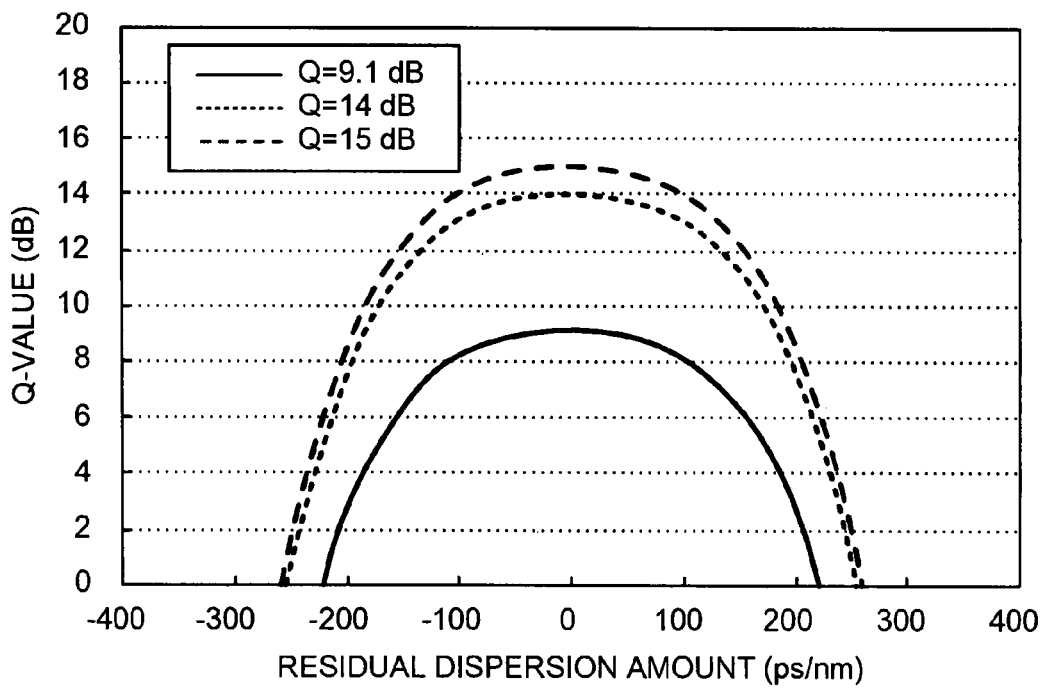
FIG. 14 is a graph of the monitored amounts of the Q-value converted signals and the residual dispersion amount.
Figure 15:
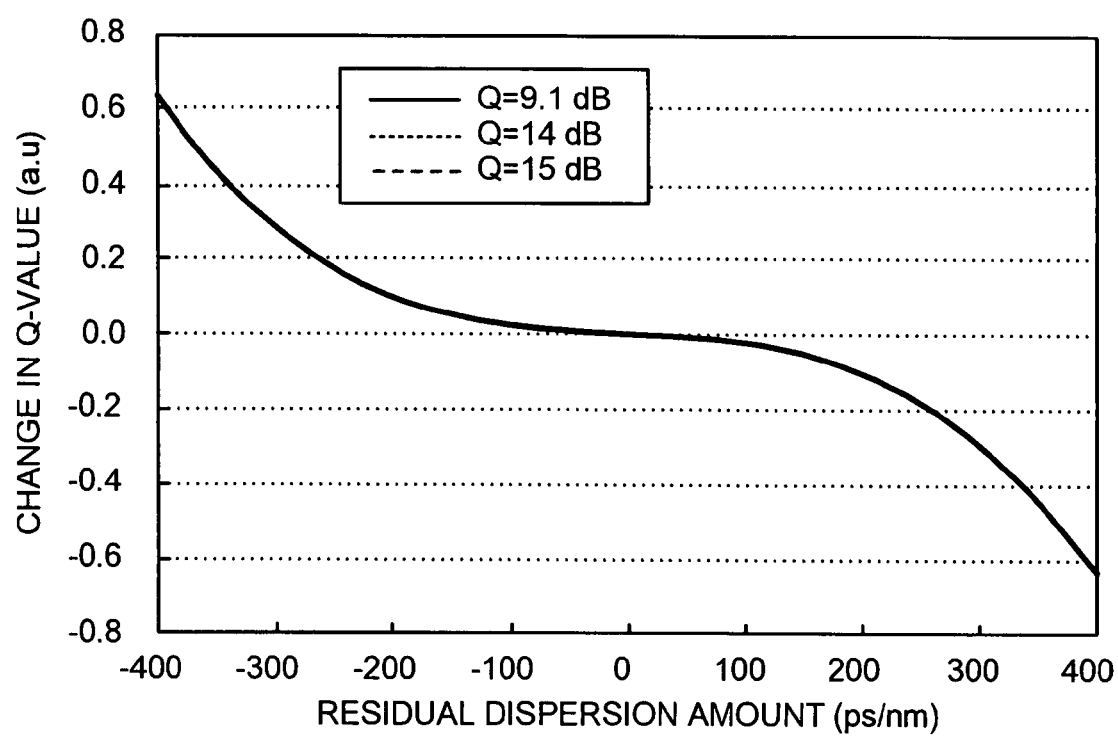
FIG. 15 is a graph of the changes in the monitored amounts of the Q-value converted signal versus the residual dispersion amount.

FIG. 14 is a graph explaining the relationship between the monitored amount of the signal Q-value-converted by the converting unit and the residual dispersion amount. FIG. 15 is a graph illustrating the relationship between the change of the monitored amount of the signal Q-value-converted by the converting unit and the residual dispersion amount. As shown in FIGS. 14 and 15, even when the Q-values at the dispersion optimal point differ, the shapes of the curves of the change of the monitored amount of the signals Q-value-converted by the converting unit 1001 versus the residual dispersion amount, are nearly the same. That is, even when the OSNR of the transmission line differs, a constant detection sensitivity of the synchronous detection can be passed.

In this way, in the dispersion compensating apparatus 1000 according to the second embodiment, the converting unit 1001 performs the predetermined logarithmic conversion or the Q-value conversion on the signals indicating error conditions output from the error monitoring unit 104, and thereby a constant detection sensitivity of the synchronous detection can be passed, even when the OSNR of the transmission line differs. Accordingly, compensation can be stably provided without changing the settings of the amplifier or the like in the dispersion compensating apparatus 1000 on every OSNR change.

Figure 16:
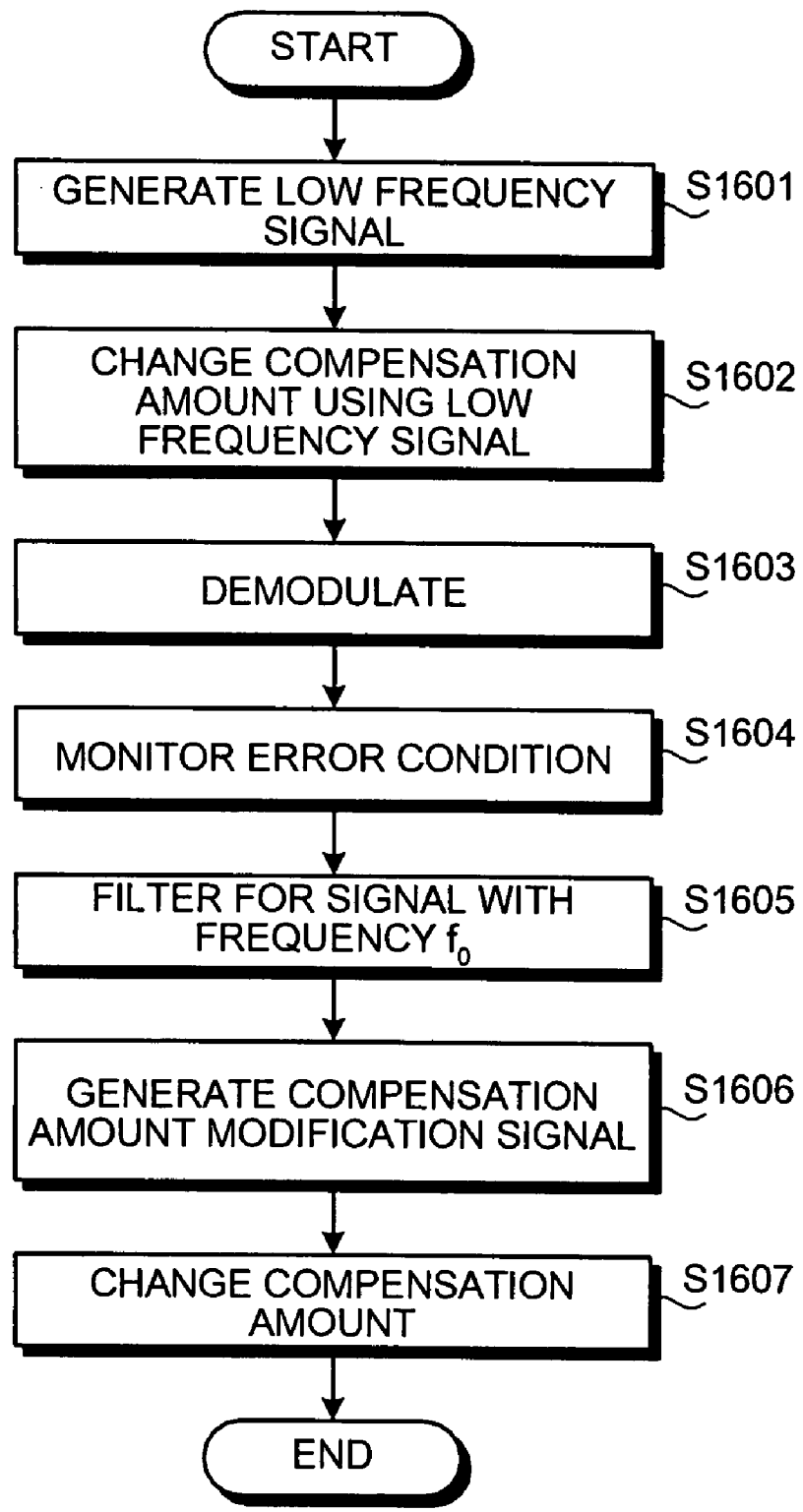
FIG. 16 is a flowchart of the operation of the dispersion compensating apparatus according to the present invention.

FIG. 16 is a flowchart outlining the operation of a dispersion compensating apparatus according to the present invention. As shown in FIG. 16, first, the low frequency oscillating circuit 101 generates the low frequency signal 201 (Step S1601). Next, the variable dispersion compensating unit 102 provides the compensation on the received optical signal, and changes the compensation amount using the low frequency signal 201 (Step S1602).

Then, the demodulating unit 103 demodulates the optical signal on which the compensation is provided at Step S1602 (Step S1603). Next, the error monitoring unit 104 monitors the error condition of the demodulated signal (Step S1604). Then, the band pass filtering unit 105 passes the signals having frequency $f_0$ from the signals indicating error conditions monitored at Step S1604 (Step S1605).

Next, the synchronous detecting circuit 106 generates the compensation amount modification signal based on the signals passed at Step S1605 and the low frequency signal 201 generated at Step S1601 (Step S1606). Then, the compensation amount changing unit 108 changes the compensation amount based on the compensation amount modification signal (Step S1607), and a series of processing is finished. By repeating this series of processing, the compensation amount of the variable dispersion compensating unit 102 converges to the optimal amount.

As described, in a dispersion compensating apparatus according to the present invention, the compensation amount by the variable dispersion compensating unit can be controlled based on the BER caused by only chromatic dispersion. Therefore, the present invention has the effect that, even if bit errors due to factors other than the chromatic dispersion arise, the compensation amount by the variable dispersion compensating unit can be optimally controlled. Moreover, even when the OSNR of the transmission line differs, a constant detection sensitivity of the synchronous detection can be passed and compensation can be stably provided.

As explained above, according to the embodiments described above, the compensation amount of the variable dispersion compensating unit can be controlled based on the BER caused only by chromatic dispersion. Therefore, according to the present invention, even if bit errors resulting from factors other than chromatic dispersion occur, the compensation amount of the variable dispersion compensating unit can be optimally controlled.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus that performs dispersion compensation on an optical signal according to a control signal of a predetermined frequency, the apparatus comprising:
    a demodulating unit that demodulates the optical signal subjected to the dispersion compensation;
    a monitoring unit that monitors a change of a bit error rate of the optical signal demodulated by the demodulating unit against an amount of the dispersion compensation, and outputs an error signal indicating the change of the bit error rate;
    a filtering unit that filters the error signal and allows a component to pass through, wherein the component has a frequency substantially equal to or less than the predetermined frequency;
    a generating unit that generates a modification signal by comparing the component of the error signal with the control signal; and a superposing unit that superposes the modification signal on the control signal to change the amount of the dispersion compensation wherein the generating unit includes:
- a multiplying unit that multiplies the component of the error signal and the control signal and outputs a product signal; and
- a low pass filtering unit that filters the product signal and allows a component to pass through, wherein the component has a frequency less than the predetermined frequency.

2. The apparatus according to claim 1, further comprising a changing unit that provides a negative feedback gain to the modification signal.

3. The apparatus according to claim 1, wherein the component of the error signal has a frequency equal to the predetermined frequency.

4. The apparatus according to claim 1, further comprising a converting unit that performs a logarithmic conversion on the error signal, wherein
the filtering unit filters the error signal subjected to the logarithmic conversion.

5. The apparatus according to claim 1, further comprising a converting unit that performs a Q-value conversion on the error signal, wherein
the filtering unit filters the error signal subjected to the Q-value conversion.

6. The apparatus according to claim 5, wherein the Q-value conversion is based on a conversion table including the bit error rate and a Q-value of the bit error rate.

7. The apparatus according to claim 5, wherein a Q-value of the bit error rate is calculated from the bit error rate by an equation.

8. The apparatus according to claim 1, wherein the monitoring unit monitors the bit error rate by performing an error correction processing of the optical signal demodulated by the demodulating unit.

9. A method for performing dispersion compensation on an optical signal according to a control signal of a predetermined frequency, the method comprising:
demodulating the optical signal subjected to the dispersion compensation;
monitoring a change of a bit error rate of the optical signal demodulated at the demodulating against an amount of the dispersion compensation;
outputting an error signal indicating the change of the bit error rate monitored at the monitoring;
filtering the error signal for allowing a component to pass through, wherein the component has a frequency substantially equal to or less than the predetermined frequency;
generating a modification signal by comparing the component of the error signal with the control signal; and
superposing the modification signal on the control signal to change the amount of the dispersion compensation wherein the generating includes:
multiplying the component of the error signal and the control signal and outputting a product signal; and
filtering the product signal and allows a component to pass through, wherein the component has a frequency less than the predetermined frequency.

10. The method according to claim 9, further comprising providing a negative feedback gain to the modification signal.

11. The method according to claim 9, further comprising performing a logarithmic conversion on the error signal, wherein
the filtering includes filtering the error signal subjected to the logarithmic conversion.

12. The method according to claim 9, further comprising performing a Q-value conversion on the error signal, wherein
the filtering includes filtering the error signal subjected to the Q-value conversion.

13. An apparatus that performs dispersion compensation on an optical signal according to a control signal of a predetermined frequency, the apparatus comprising:
a monitoring unit that monitors a change of a bit error rate of a demodulated signal against an amount of the dispersion compensation, the demodulated signal being obtained by demodulating the optical signal, and outputs an error signal indicating the change of the bit error rate;
a generating unit that generates a modification signal by comparing the component of the error signal with the control signal; and
a superposing unit that superposes the modification signal on the control signal to change the amount of the dispersion compensation wherein the generating unit includes:
a multiplying unit that multiplies a component of the error signal and the control signal and outputs a product signal; and
a low pass filtering unit that filters the product signal and allows a component to pass through, wherein the component has a frequency less than the predetermined frequency.

\* \* \* \* \*